(12) United States Patent
Badger et al.

(10) Patent No.: US 10,829,106 B2
(45) Date of Patent: Nov. 10, 2020

(54) METHOD AND SYSTEM FOR IMPROVING DRIVABILITY OF PHEV HAVING LOW TRACTION BATTERY DISCHARGE LIMITS

(71) Applicant: Ford Global Technologies, LLC, Dearborn, MI (US)

(72) Inventors: Justin Reuel Badger, Plymouth, MI (US); Floyd Cadwell, Dearborn, MI (US); Carol Louise Okubo, Dearborn, MI (US); Jacob Doan, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 234 days.

(21) Appl. No.: 16/149,500

(22) Filed: Oct. 2, 2018

(65) Prior Publication Data

US 2020/0101964 A1    Apr. 2, 2020

(51) Int. Cl.
*B60W 20/13*     (2016.01)
*B60W 20/20*     (2016.01)
*B60W 10/08*     (2006.01)
*B60W 30/18*     (2012.01)

(52) U.S. Cl.
CPC .......... *B60W 20/13* (2016.01); *B60W 10/08* (2013.01); *B60W 20/20* (2013.01); *B60W 30/18127* (2013.01); *B60W 2510/18* (2013.01); *B60W 2510/244* (2013.01)

(58) Field of Classification Search
CPC ...... B60W 20/13; B60W 10/08; B60W 20/20; B60W 30/18127; B60W 2510/18; B60W 2510/244
USPC .......................................................... 701/22
See application file for complete search history.

(56) References Cited

U.S. PATENT DOCUMENTS

| | | | | |
|---|---|---|---|---|
| 9,643,593 | B2* | 5/2017 | Dalum | B60W 10/08 |
| 9,718,459 | B2* | 8/2017 | Imamura | B60K 6/442 |
| 2015/0307083 | A1* | 10/2015 | Hisano | B60W 50/082 |
| | | | | 701/22 |
| 2016/0137186 | A1* | 5/2016 | Ishishita | B60W 10/18 |
| | | | | 701/22 |
| 2016/0229411 | A1* | 8/2016 | Murata | B60W 10/08 |
| 2016/0243958 | A1* | 8/2016 | Miller | B60L 3/12 |
| 2017/0001624 | A1* | 1/2017 | Wang | B60W 10/06 |

* cited by examiner

*Primary Examiner* — Yazan A Soofi
(74) *Attorney, Agent, or Firm* — David B. Kelley; Brooks Kushman P.C.

(57) ABSTRACT

Methods and systems for a vehicle such as a plug-in hybrid electric vehicle (PHEV) having a traction battery are for improving the drivability of the vehicle the battery has low discharge limits. The battery may have such low discharge limits due to the battery being cold and/or the battery state-of-charge (SOC) being low. In operation, upon the battery having a discharge limit lower than a threshold while the vehicle is operating in a charge sustain mode, the engine of the vehicle is used to charge the battery to increase the SOC of the battery such that the battery has a discharge limit greater than the threshold. The vehicle is operated in the charge sustain mode using the battery with the increased SOC.

14 Claims, 4 Drawing Sheets

METHOD AND SYSTEM FOR IMPROVING DRIVABILITY OF PHEV HAVING LOW TRACTION BATTERY DISCHARGE LIMITS

TECHNICAL FIELD

The present disclosure relates to improving drivability of a plug-in hybrid electric vehicle (PEV) having low traction battery discharge limits.

BACKGROUND

A plug-in hybrid electric vehicle (PHEV) has a traction battery for supplying power for propulsion. The battery is to have a certain minimum amount of battery discharge available for xEV drivability of the vehicle.

The battery temperature and the battery state-of-charge (SOC) influence the discharge and charge limits of the battery. Generally, these limits decrease as the battery temperature decreases and decrease as the battery SOC decreases. Thus, when the battery is cold and has a low SOC, the battery has a low discharge limit which may result in poor drivability of the PHEV.

SUMMARY

A method for a vehicle, such as a plug-in hybrid electric vehicle (PHEV), having an engine and a battery is provided. The method includes, upon the battery having a discharge limit lower than a threshold while the vehicle is operating in a charge sustain mode, charging the battery with the engine to increase a state-of-charge (SOC) of the battery such that the battery has a discharge limit greater than the threshold. The method further includes operating the vehicle in the charge sustain mode using the battery with the increased SOC.

The method may further include, after operating the vehicle in the charge sustain mode using the battery with the increased SOC, controlling the battery to lower the SOC of the battery to an original SOC that the battery had prior to the step of charging the battery with the engine. In this case, the method may further include operating the vehicle in the charge sustain mode using the battery with the original SOC while the battery has a discharge limit greater than the threshold.

The method may further include detecting a discharge limit of the battery at a current time based on a temperature of the battery at the current time and a SOC of the battery at the current time.

The step of charging the battery with the engine to increase the SOC of the battery may include increasing the SOC of the battery to a SOC set point dependent on a desired discharge limit for the battery and a temperature of the battery.

The method may further include operating the vehicle in a charge deplete mode prior to operating the vehicle in the charge sustain mode.

Another method for a vehicle having an engine and a battery is provided. This method includes operating the vehicle in a charge sustain mode with a charge sustain window based on an initial SOC of the battery. The charge sustain window is initially associated with a battery discharge limit greater than a threshold. Upon the battery getting colder such that the charge sustain window becomes associated with a battery discharge limit lower than the threshold, the battery is charged with the engine to increase the SOC of the battery to a higher SOC and thereby establish a new charge sustain window based on the higher SOC. The new charge sustain window is associated with a battery discharge limit greater than the threshold. The vehicle is operated in the charge sustain mode with the new charge sustain window based on the higher SOC of the battery.

Another method for a vehicle having an engine and a battery is provided. This method includes, upon the battery having a discharge limit lower than a threshold while the vehicle is operating in a charge deplete mode, charging the battery with the engine to hold a SOC of the battery from decreasing further. At the point such as with the battery being below a certain temperature threshold, the method further includes operating the vehicle in a charge sustain mode while the SOC of the battery is being held from decreasing further.

A system for a vehicle having an engine and a battery is provided. The system includes a controller configured to carry out the operations of the methods described above.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
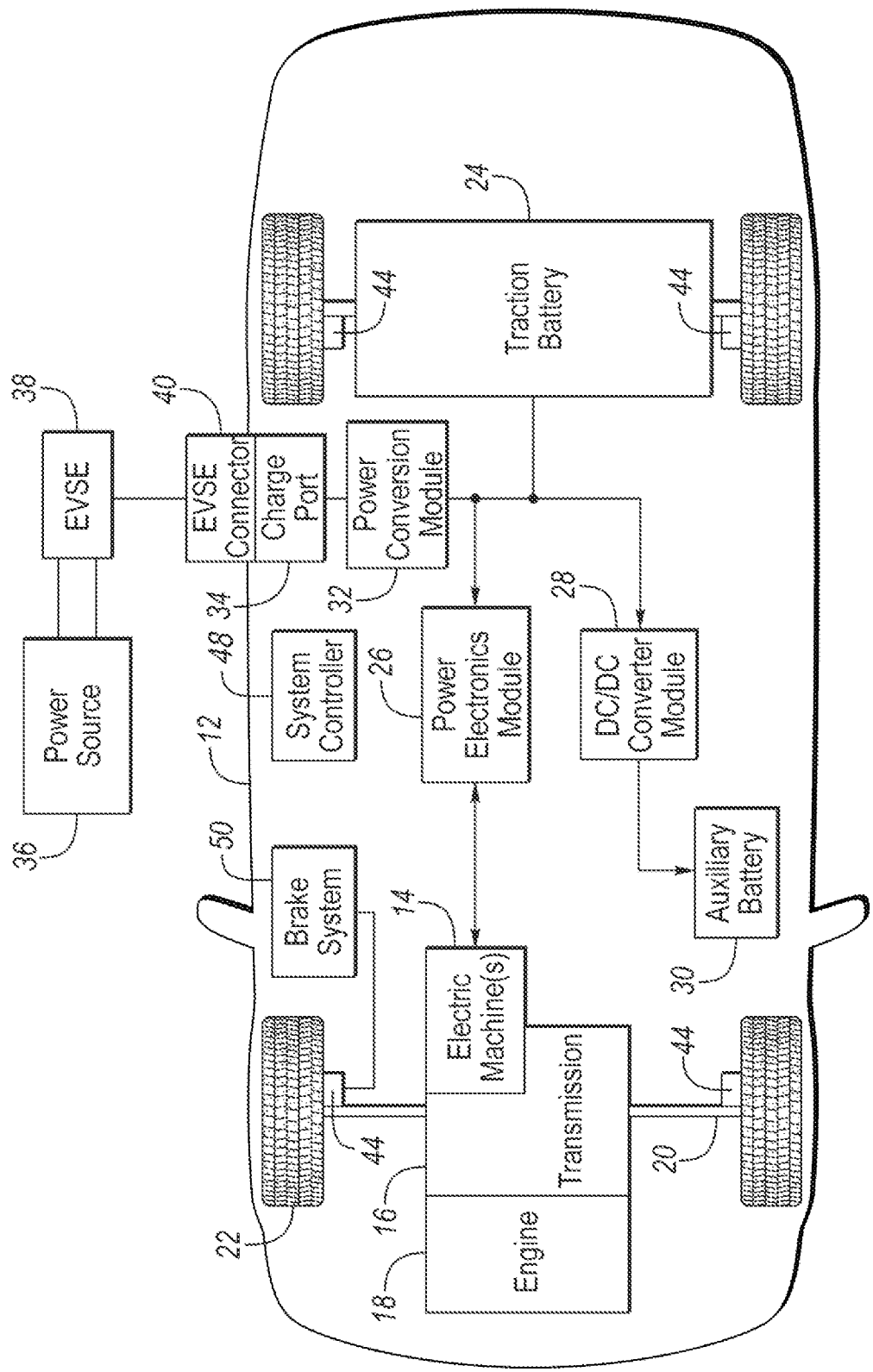
FIG. 1 illustrates a block diagram of a plug-in hybrid electric vehicle (PHEV) showing typical drivetrain and energy storage components including a traction battery.

Referring now to FIG. 1, a block diagram of a typical plug-in hybrid electric vehicle (PHEV) 12 is shown. Vehicle 12 includes one or more electric machines 14 mechanically connected to a transmission 16. Electric machines 14 may be capable of operating as a motor or a generator. Transmission 16 is mechanically connected to an engine 18. Transmission 16 is also mechanically connected to a drive shaft 20 that is mechanically connected to wheels 22. Electric machines 14 can provide propulsion and deceleration capability when engine 18 is turned on or off. Electric machines 14 also act as generators and can provide fuel economy benefits by recovering energy that would normally be lost as heat in the friction braking system. Electric machines 14 may also reduce vehicle emissions by allowing engine 18 to operate at more efficient speeds and allowing vehicle 12 to be operated in electric mode with engine 18 off under certain conditions.

A traction battery 24 ("battery) stores energy that can be used by electric machines 14. Battery 24 typically provides a high voltage DC output. Battery 24 is electrically connected to one or more power electronics modules 26. Power electronics module 26 is also electrically connected to electric machines 14 and provides the ability to bi-directionally transfer energy between battery 24 and the electric machines. For example, battery 24 may provide a DC voltage while electric machines 14 may require a three-phase AC current to function. Power electronics module 26 may convert the DC voltage to a three-phase AC current as required by electric machines 14. In a regenerative mode, power electronics module 26 may convert the three-phase AC current from electric machines 14 acting as generators to the DC voltage required by battery 24.

In addition to providing energy for propulsion, battery 24 may provide energy for other vehicle electrical systems. A typical system may include a DC/DC converter module 28 that converts the high voltage DC output of battery 24 to a low voltage DC supply that is compatible with other vehicle loads. Other high-voltage loads, such as compressors and electric heaters, may be connected directly to the high-voltage without the use of DC/DC converter module 28. Low-voltage loads may be electrically connected to an auxiliary (e.g., 12 V) battery 30.

Battery 24 may be recharged by an external power source 36. External power source 36 may be a connection to an electrical outlet. External power source 36 may be electrically connected to electric vehicle supply equipment (EVSE) 38. EVSE 38 may provide circuitry and controls to regulate and manage the transfer of energy between external power source 36 and vehicle 12. External power source 36 may provide DC or AC electric power to EVSE 38. EVSE 38 may have a charge connector 40 for plugging into a charge port 34 of vehicle 12. Charge port 34 may be any type of port configured to transfer power from EVSE 38 to vehicle 12. Charge port 34 may be electrically connected to a charger or on-board power conversion module 32. Power conversion module 32 may condition the power supplied from EVSE 38 to provide the proper voltage and current levels to battery 24. Power conversion module 32 may interface with EVSE 38 to coordinate the delivery of power to vehicle 12. EVSE connector 40 may have pins that mate with corresponding recesses of charge port 34. Alternatively, various components described as being electrically connected may transfer power using a wireless inductive coupling.

Wheel brakes 44 are provided for decelerating vehicle 12 and preventing motion of the vehicle. Wheel brakes 44 are part of a brake system 50. Brake system 50 may include a controller to monitor and control wheel brakes 44 to achieve desired operation.

The various components discussed may have one or more associated controllers to control and monitor the operation of the components. The controllers may communicate via a serial bus (e.g., Controller Area Network (CAN)) or via discrete conductors.

For example, a system controller 48 (i.e., a vehicle controller) ("controller" or "controller 48") is present to coordinate the operation of the various components. Among other functions, controller 48 is operable for detecting the temperature of battery 24 and the state-of-charge (SOC) of the battery. For instance, controller 48 may include or be in communication with a thermometer configured to detect the temperature of battery 24. Likewise, controller 48 may include or be in communication with a sensor configured to detect or calculate the SOC of battery 24.

As described, the temperature and SOC of battery 24 influence the discharge limits of the battery. Particularly, the discharge limits are reduced when battery 24 is cold compared to when the battery is warm. Likewise, the discharge limits are reduced when battery 24 has a low SOC than when the battery has a high SOC.

Thus, when battery 24 is cold and/or has a low SOC, the battery may have low discharge limits which may result in poor drivability of vehicle 12. The poor drivability may include stumbling/hesitation during accelerator pedal tip-ins, low performance due to reduced electric motor assist, and increased engine on time due to engine pull-up discharge limit threshold.

As a PHEV, vehicle 12 typically operates in two main modes: charge deplete (CD) and charge sustain (CS). In the charge deplete mode, battery 24 is largely used to propel vehicle 12. Battery 24 has a relatively high SOC during the charge deplete mode and thus has enough energy to propel vehicle 12 with no or little assistance from engine 18. As battery 24 has a high SOC, which decreases as the battery depletes, the discharge limits of the battery during the charge deplete mode are high. Further, the temperature of battery 24 increases (i.e., the battery warms up) as the battery depletes during the charge deplete mode. Battery 24 with a given SOC will have a higher discharge limit when the battery is warmer.

At the bottom of the charge window (meaning that battery 24 now has a relatively low SOC due to the battery being depleted), vehicle 12 enters the charge sustain mode. In the charge sustain mode, vehicle 12 operates like a FHEV (full hybrid electric vehicle) with battery 24 operating in a narrow SOC range. Ordinarily, battery 24 is maintained in the charge sustain region until the battery is recharged either via regenerative braking (e.g., the vehicle traveling down a long grade) or via being plugged into external power source 36.

The narrow SOC range in which battery 24 operates while in the charge sustain mode is, for example, 15% to 20% SOC. The charge sustain window operation of battery 24 (i.e., a typical electric vehicle high-voltage (HV) battery) is on the order of, for example, 400-kWh.

An issue is that when vehicle 12 is in a cold climate, battery 24 may have low discharge limits while the vehicle is operating in the charge sustain mode. Battery 24 may have these low discharge limits due to the battery SOC being relatively low (i.e., falling in the range of 15% to 20% SOC) and due to the battery being cold because of vehicle 12 being in the cold climate.

Figure 2:
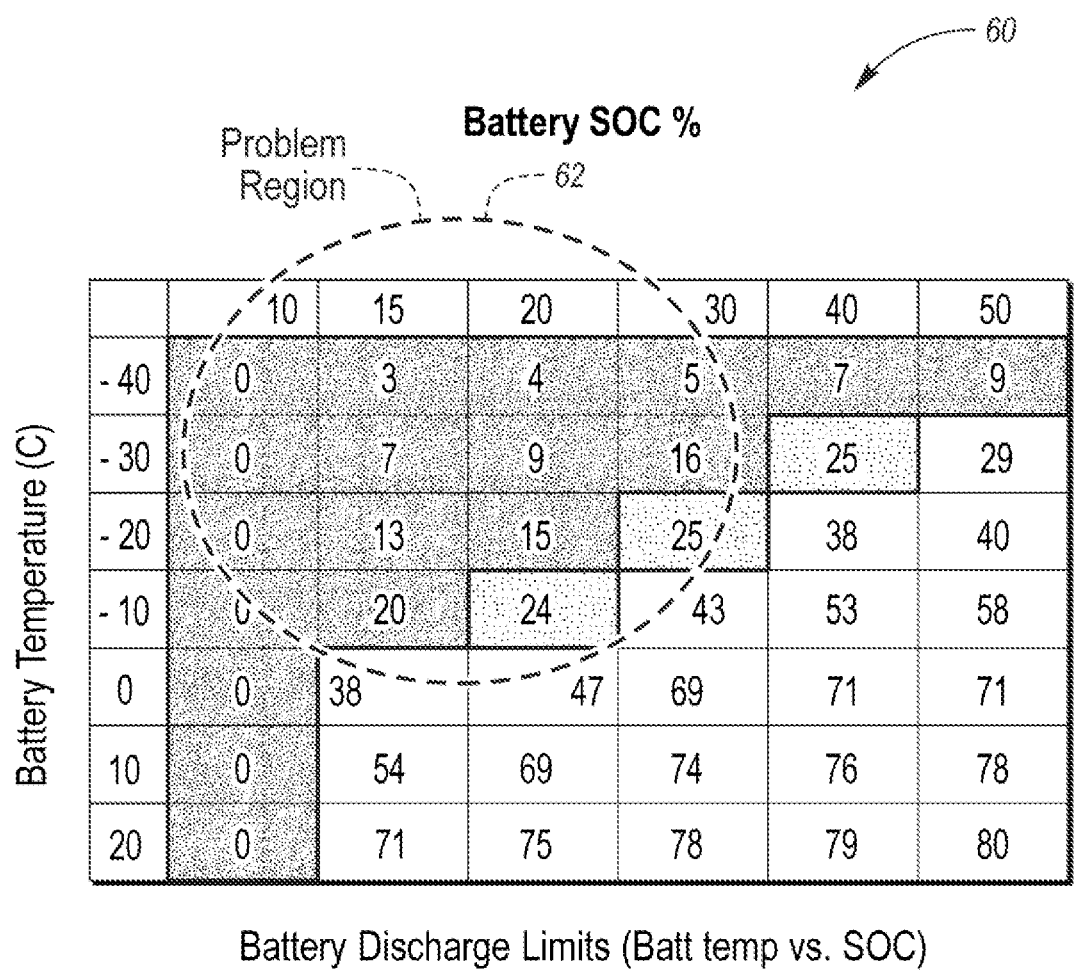
FIG. 2 illustrates a chart having exemplary discharge limits of the traction battery at battery temperature and battery state-of-charge (SOC) combinations.

Referring now to FIG. 2, a chart 60 of exemplary discharge limits of battery 24 is shown. Chart 60 lists exemplary discharge limits for combinations of battery temperature and SOC. For instance, as shown in chart 60, battery 24 has a discharge limit of 43 kW when the battery temperature is −10° C. and the battery SOC is 30% and a discharge limit of 20 kW when the battery temperature is −10° C. and the battery SOC is 15%. (This is an example of the discharge limits being different for the same battery temperature and different battery SOCs.) The discharge limit of 20 kW, occurring when the battery temperature is −10° C. and the battery SOC is 15%, is considered as being low by being lower than an exemplary target discharge limit or threshold of 30 kW.

As indicated, the discharge limits listed in chart 60 are exemplary. Actual instantaneous values of the discharge limit of battery 24 are outputted to controller 48 by a battery controller. The battery controller may be a part of battery 24, a part of controller 48, or may be its own discrete hardware component. The battery controller includes tables needed to determine the discharge limit of battery 24 given the battery SOC and the battery temperature (among other factors). For purposes of explanation of the operation of the method and system in accordance with the present disclosure, it will be assumed that the actual instantaneous discharge limit values of battery 24 correspond to the discharge limits listed in chart 60 for the same temperature and SOC combinations. combination As described, while vehicle 12 is in the charge sustain mode during cold weather, battery 24 may have low discharge limits. During the charge sustain mode, the SOC of battery 24 is maintained within the range of 15% to 20% SOC. Depending on the weather being cold enough, the temperature of battery 24 could be lower than −10° C. Thus, for example, battery 24 has a low SOC (15% to 20% SOC) and a low temperature (−10° C.) while vehicle 12 is in the charge sustain mode during cold (i.e., −10° C.) weather. Low SOC and low temperature combinations result in battery 24 having low discharge limits, as indicated in chart 60.

Chart 60 lists the discharge limits of 20 kW for battery 24 having a 15% SOC and a temperature of −10° C. and 24 kW for the battery having a 20% SOC and a temperature of −10° C. Both discharge limits are lower than the exemplary target discharge limit of 30 kW. Both discharge limits therefore fall into a problem region 62 of chart 60. Problem region 62 encompasses discharge limits lower than the target discharge limit of 30 kW for realistic operating conditions (i.e., battery temperature vs. battery SOC) of battery 24.

Figure 3:
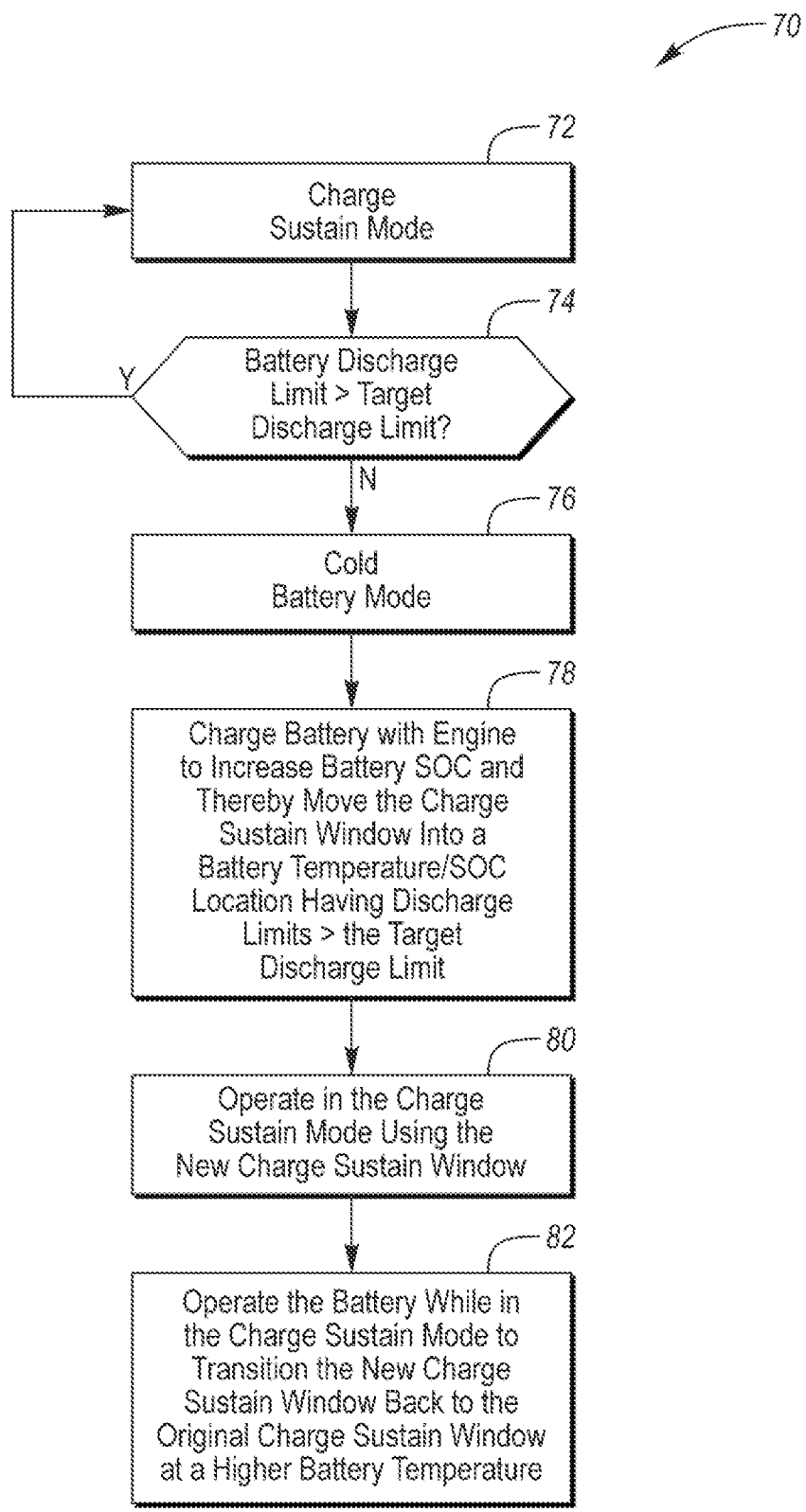
FIG. 3 illustrates a flowchart depicting operation of a method and system for improving the drivability of the PHEV when the traction battery has low discharge limits.

Referring now to FIG. 3, with continual reference to FIGS. 1 and 2, a flowchart 70 depicting operation of a method and system in accordance with the present disclosure is shown. The method and system are for improving the drivability of vehicle 12 when battery 24 has low discharge limits. As described, battery 24 may have low discharge limits due to the battery being cold and/or the battery SOC being low.

Initially, vehicle 12 may operate in the charge deplete mode. Upon battery 24 depleting more than a certain threshold during the charge deplete mode, vehicle 12 operates in the charge sustain mode, as indicated by block 72. In the charge sustain mode, battery 24 has a charge sustain window of, for example, 15% to 20% SOC and a 400-kWh output.

While vehicle 12 operates in the charge sustain mode, controller 48 compares a current discharge limit of battery 24 to the target discharge limit, as indicated in decision block 74. As described, controller 48 obtains the current discharge limit of battery 24 from the battery controller. The battery controller determines the current discharge limit given the current battery SOC and the current battery temperature (among other factors).

If the discharge limit of battery 24 is greater than the target discharge limit, then system controller 48 maintains ordinary operation in the charge sustain mode according to block 72. The ordinary operation in the charge sustain mode, as described, entails operating battery 24 in the 15% to 20% SOC range until the battery is recharged via external power source or regeneration. Controller 48 then repeats the comparison process of decision block 74 after waiting a set period.

If the discharge limit of battery 24 is lower than the minimum discharge limit, then controller 48 begins vehicle operation in a "cold battery mode" provided by the present disclosure, as indicated in block 76. In the cold battery mode, a new charge sustain window of battery 24 is established at a higher raw SOC to take advantage of the higher discharge limits available there. The new charge sustain window is, for example, 30% to 40% SOC and a 400-kWh output. A set point for the new charge sustain window depends on a target discharge limit for the battery and the battery temperature. Controller 48 may select the new charge sustain window SOC operating range using a table as a function of battery temperature (open loop) or using a feedback on the discharge limit of battery 24 (closed loop).

A first operation of the cold battery mode involves increasing the charge of battery 24. Particularly, engine 18 charges battery 24 up to the new charge sustain window, as indicated in block 78. A second operation of the cold battery mode involves operating battery 24 in the charge sustain mode using the new charge sustain window, as indicated in block 80.

With reference to chart 60 shown in FIG. 2, the discharge limits at a battery temperature of −10° C. for 30% SOC and 40% SOC are 43 kW and 53 kW, respectively. Both discharge limits are greater than the target discharge limit of 30 kW. Thus, while operating in the charge sustain mode with the new charge sustain window of 30% to 40% SOC and a 400-kWh output per block 80, the discharge limits of battery 24 are higher than the target discharge limit and thus are not problematic to the drivability of vehicle 12.

The operating of battery 24 in the charge sustain mode using the new charge sustain window further involves operating the battery to transition the new charge sustain window back to the original charge sustain window (i.e., transition the 30% to 40% SOC range back to the 15% to 20% SOC range), as indicated in block 82. The primary reason of transitioning the new charge sustain window back to the original charge sustain window is to reestablish the normal charge sustain operating range (e.g., 15% to 20% SOC range) once battery 24 is warm. The decision to bring the new charge sustain window back down is driven by observing higher battery temperatures and/or higher discharge limits (depending on how controller 48 selected the new charge sustain window SOC operating range).

Battery 24 is depleted in bringing the new charge sustain mode back to the 15% to 20% SOC range. As battery 24 is depleted, the battery temperature increases. Thus, the original charge sustain window is reestablished at a higher battery temperature. With reference to chart 60 of FIG. 2, the original charge sustain window (i.e., 15% to 20% SOC range) at the higher battery temperature (e.g., +10° C. to +20° C.) is associated with discharge limits greater than the target discharge limit.

Thus, the solution provided by the method and system of the present disclosure for battery 24 having low discharge limits while the battery is operating with a given charge sustain window (e.g., 15% to 20% SOC and a 400-kWh output) includes increasing the discharge limits by establishing a new charge sustain window (e.g., 30% to 40% SOC and a 400-kWh output). As such, the new charge sustain window is established at higher raw SOC (e.g., established in the charge deplete zone).

The new charge sustain window is established by controller 48 controlling engine 18 to charge battery 24. A set point for the new charge sustain window depends on a target or desired discharge limit for battery 24 and the battery temperature. Thus, controller 48 monitors the temperature of battery 24 as the battery is charged by engine 18. In this way, controller 48 employs a feedback loop on the new charge sustain window, since as battery 24 warms up a lower SOC will achieve the target discharge limit. This means that the new charge sustain window is a floating target.

After the new charge sustain window is reached, normal charge sustain operation is re-entered. That is, controller 48 continues operating in the charge sustain mode using the new charge sustain window. Controller 48 adjusts this charge sustain operation to transition the new charge sustain window back down towards the original charge sustain window as battery 24 warms up. Controller 48 employs the feedback loop in making this adjustment. For example, if the target discharge limit is 30 kW, then as battery 24 warms that discharge limit can be achieved at a lower SOC.

Figure 4:
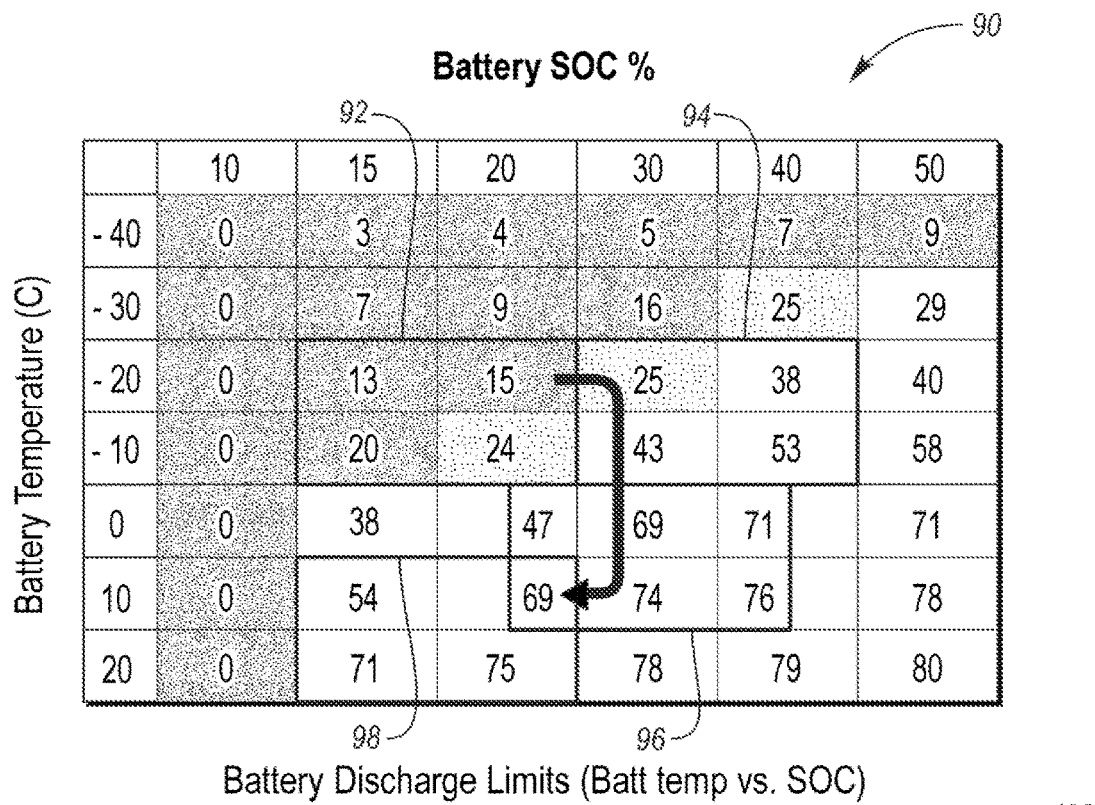
FIG. 4 illustrates a chart, like the chart of FIG. 2, in which it is depicted how the charge sustain window floats higher in absolute battery SOC and floats back to its original location according to the operation of the method and system of the present disclosure.

Referring now to FIG. 4, with continual reference to FIGS. 1, 2, and 3, a chart 90, like chart 60 of FIG. 2, is shown in which it is depicted how the charge sustain window floats higher in absolute battery SOC and floats back towards its original location according to the operation of the method and system of the present disclosure. Initially, battery 24, assumed to have a battery temperature on the order of −10° C. to −20° C., has a charge sustain window at an original location 92 (15% to 20% SOC) in chart 90. The discharge limits of battery 24 listed in chart 90 for the charge sustain window at original location 92 are all under the exemplary target discharge limit of 30 kW.

Controller 48 commences operation in the cold battery mode (block 76 of FIG. 3) due to the discharge limit of battery 24 being lower than the target discharge limit (decision block 74 of FIG. 3). Controller 48 commences operation in the cold battery mode by having engine 18 charge battery 24 (block 78 in FIG. 3) to increase the battery SOC and thereby establish the charge sustain window at a new location 94 (30% to 40% SOC) in chart 90. As such, as shown in chart 90 of FIG. 4, the charge sustain window floats to the right in the chart until higher discharge limits are achieved via higher battery SOC. As described, a feedback loop on the discharge limit and battery temperature is used to regulate this process.

Controller 48 then operates battery 24 in the charge sustain mode (block 80 of FIG. 3) using the charge sustain window established at new location 94. The discharge limits of battery 24 listed in chart 90 for the charge sustain window at new location 94 are all above the target discharge limit of 30 kW. Thus, battery 24 does not have any concerning low discharge limits while operating in the charge sustain mode with the charge sustain window at new location 94.

While operating battery 24 in the charge sustain mode using the charge sustain window established at new location 94, controller 48 operates the battery to transition the charge sustain window back to the original operating range of 15% to 20% SOC (block 82 in FIG. 3). Again, once battery 24 is warm, the new charge sustain window back is transitioned back to the original charge sustain window to reestablish the original operating range of 15% to 20% SOC. This transitioning involves, for example, operating battery 24 in the charge sustain mode using lowering SOC ranges over time. For example, battery 24 is operated in the updated operating range of 30% to 40% SOC for a period, then 29% to 39% SOC for a next period, then 28% to 38% for a next period . . . until the original operating range of 15% to 20% SOC.

As battery 24 depletes in this manner the temperature of the battery increases. Thus, the charge sustain window floats back from new location 94 to an intermediate location 96 in chart 90 to a final location 98 in chart 90. The discharge limits in chart 90 for the charge sustain window at intermediate location 96 and at final location 98 are all above the target discharge limit of 30 kW. Thus, battery 24 does not have any concerning low discharge limits while operating in the charge sustain mode with the charge sustain window at intermediate location 96 or at final location 98.

Notably, as shown in chart 90, final location 98 corresponds to battery 24 having the original SOC operating range of 15% to 20%, but having a warmer temperature on the order of +10° C. to +20° C. than the original temperature on the order of −10° C. to −20° C. In this way, the charge sustain window floats back to its original range of 15% to 20% SOC once the battery temperature increases and the discharge limits thereby improve.

When the temperature of battery 24 subsequently decreases due to vehicle 12 being turned off and parked in cold weather, the charge sustain window initiates at original location 92 (where the battery temperature is on the order of −10° C. to −20° C.). The discharge limits of battery 24 for the charge sustain window at original location 92 are all below the target discharge limit. Accordingly, controller 48 repeats the operation in the cold battery mode once operation of vehicle 12 is initiated.

Figure 5:
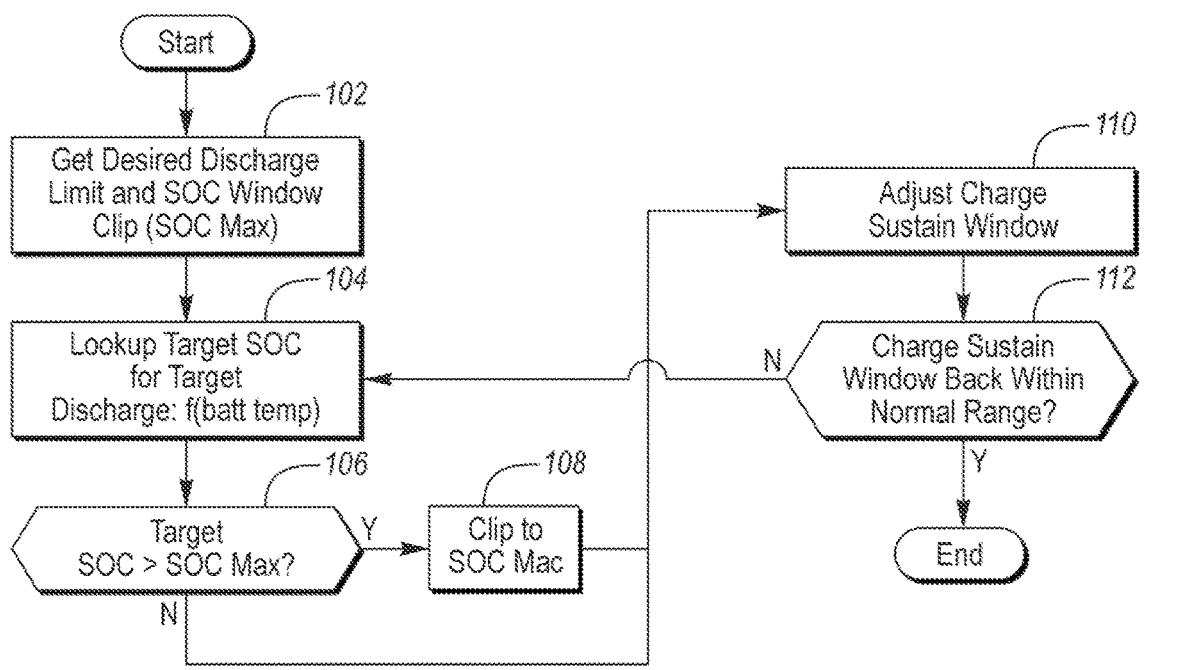
FIG. 5 illustrates a flowchart further depicting operation of the method and system of the present disclosure.

Referring now to FIG. 5, with continual reference to FIGS. 1, 2, 3, and 4, a flowchart 100 further depicting operation of the method and system of the present disclosure is shown. The operation begins with controller 48 obtaining a target or desired discharge limit and a SOC window clip (i.e., SOC maximum value), as indicated in block 102. Controller 48 then looks up (e.g., in chart 60 or 90) a target SOC for the target discharge limit as indicated in block 104. As described, and as shown in charts 60 and 90, the target SOC for the target discharge limit is a function of the temperature of battery 24, as further indicated in block 104.

Controller 48 then determines whether the target SOC is greater than the SOC maximum value, as indicated in decision block 106. If so, then controller 48 clips the target SOC to the value of the SOC maximum value as indicated in block 108.

Controller 48 then controls engine 18 to charge battery 24 to thereby adjust the charge sustain window (e.g., from the operating range of 15% to 20% SOC to the operating range of 30% to 40% SOC) as indicated in block 110. Controller 48 then operates battery 24 in the charge sustain mode using the adjusted charge sustain window—this corresponds to new location 94 of block 90 in FIG. 4.

Controller 48 then checks to determine whether the charge sustain window is back to its normal operating range (i.e., the operating range of 15% to 20% SOC) as indicated in decision block 112. At this first iteration, the charge sustain window is in the operating range of 30% to 40% SOC and therefore is not back to its normal operating range.

Controller 48 then looks up (e.g., in chart 60 or 90) an updated target SOC for the desired discharge limit as indicated in block 104. The updated target SOC is looked up as the temperature of battery 24 has increased while operating the battery in the charge sustain mode using the adjusted charge sustain window. Controller 48 then controls engine 18 and battery 24 to adjust the charge sustain window (e.g., from the operating range of 30% to 40% SOC to the operating range of 29% to 39% SOC) as indicated in block 110. Controller 48 then operates battery 24 in the charge sustain mode using this adjusted charge sustain window and the process repeats. The process repeats until the final adjusted charge sustain window has an operating range matching the original operating range of 15% to 20% SOC—this corresponds to final location 98 of block 90 in FIG. 4.

As described, the method and system of the present disclosure improve/offer more consistent powertrain performance for a PHEV during cold weather operation by leveraging the inherent higher battery charge/discharge limits which come with higher battery SOC levels. The logic of the method and system is not executed during charge deplete operation because the discharge limits of the battery are high enough to sustain normal powertrain performance. On the other hand, during periods of charge sustain operation and low battery temperature, the method and system "float" the charge sustain window to higher absolute battery SOC to operate at the associated higher discharge limits. As such, the discharge limits will increase because the battery is charged to higher SOC levels. As the discharge limits increase either due to battery SOC and/or battery temperature, the method and system float the charge sustain window back down to the original SOC region. This is done based on calibratable battery SOC/temperature as well as discharge limit thresholds, with a feedback loop on the discharge limits and battery temperature. The charging rate is also calibratable. The operation of the method and system is automatic (i.e., implemented by controller 48). The operation of the method and system can be used in other situations such as vehicle pre-conditioning, while charging on-plug, etc.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for a vehicle operating in a charge sustain mode, comprising:
   charging a battery, having a temperature and an initial state-of-charge (SOC) resulting in a low battery discharge limit, with an engine to increase the SOC resulting in a high battery discharge limit;
   controlling the battery to lower the increased SOC as battery temperature rises such that the battery has an increased temperature and the initial SOC resulting in a high battery discharge limit.

2. The method of claim 1 further comprising:
   detecting a discharge limit of the battery at a current time based on a temperature of the battery at the current time and a SOC of the battery at the current time.

3. The method of claim 1 wherein:
   the step of charging the battery with the engine to increase the SOC of the battery includes increasing the SOC of the battery to a set point dependent on a desired discharge limit for the battery and a temperature of the battery.

4. The method of claim 1 further comprising:
   operating the vehicle in a charge deplete mode prior to operating the vehicle in the charge sustain mode.

5. The method of claim 1 wherein:
   the vehicle is a plug-in hybrid electric vehicle (PHEV).

6. A method for a vehicle having an engine and a battery, comprising:
   operating the vehicle in a charge sustain mode with a desired charge sustain window based on an initial state-of-charge (SOC) of the battery, wherein the desired charge sustain window is initially associated with a battery discharge limit greater than a threshold;
   while operating the vehicle in the charge sustain mode, upon the battery getting colder such that the desired charge sustain window becomes associated with a battery discharge limit lower than the threshold, charging the battery with the engine to increase the SOC of the battery to a higher SOC and thereby establish a temporary charge sustain window based on the higher SOC, wherein the temporary charge sustain window is associated with a battery discharge limit greater than the threshold; and
   while operating the vehicle in the charge sustain mode with the temporary charge sustain window based on the higher SOC, controlling the battery to lower the higher SOC to the initial SOC as the battery gets warmer and thereby reestablish the desired charge sustain window based on the initial SOC, wherein the desired charge sustain window is re-associated with a battery discharge limit greater than the threshold due to the battery having an increased temperature in conjunction with the initial SOC.

7. The method of claim 6 further comprising:
   detecting a discharge limit of the battery at a current time based on a temperature of the battery at the current time and a SOC of the battery at the current time.

8. The method of claim 6 wherein:
   the step of charging the battery with the engine to increase the SOC of the battery to a higher SOC includes increasing the SOC of the battery to a set point dependent on a desired discharge limit for the battery and a temperature of the battery.

9. The method of claim 6 further comprising:
   operating the vehicle in a charge deplete mode prior to operating the vehicle in the charge sustain mode.

10. A system for a vehicle having an engine and a battery, comprising:
    a controller configured to charge the battery, having an initial temperature and an initial state-of-charge (SOC) combination resulting in the battery having a discharge limit lower than a threshold while the vehicle is operating in a charge sustain mode, with the engine to increase the SOC such that the battery has the initial temperature and an increased SOC combination resulting in the battery having a discharge limit greater than the threshold; and
    the controller further configured to, while the vehicle is operating in the charge sustain mode after the battery has been charged with the engine to increase the SOC to the increased SOC, control the battery to lower the increased SOC to the initial SOC depending on a rise in the temperature of the battery such that the battery has an increased temperature and the initial SOC combination resulting in the battery having a discharge limit greater than the threshold.

11. The system of claim 10 wherein:
    the controller is further configured to detect a discharge limit of the battery at a current time based on a temperature of the battery at the current time and a SOC of the battery at the current time.

12. The system of claim 10 wherein:
    the controller is further configured to control the engine to charge the battery to increase the SOC of the battery to a set point dependent on a desired discharge limit for the battery and a temperature of the battery.

13. The system of claim 10 wherein:
    the controller is further configured to control the engine and the battery to operate the vehicle in a charge deplete mode prior to the vehicle being operated in the charge sustain mode.

14. A system for a vehicle having an engine and a battery, comprising:
    a controller configured to control the engine and the battery to operate the vehicle in a charge deplete mode while the battery has a state-of-charge (SOC) greater than a SOC threshold and to operate the vehicle in a charge sustain mode while the SOC of the battery is lower than the SOC threshold and, upon the battery having a discharge limit lower than a discharge limit threshold while the SOC of the battery is greater than the SOC threshold and the vehicle is operating in the charge deplete mode, control the engine to charge the battery to hold the SOC of the battery from decreasing further and control the engine and the battery to operate the vehicle in the charge sustain mode, even though the SOC of the battery is greater than the SOC threshold, while the SOC of the battery is being held from decreasing further.

* * * * *